Sept. 18, 1956 M. CAMRAS 2,763,729

CORE STRUCTURE FOR MAGNETIC TRANSDUCER HEAD

Filed Nov. 3, 1950 3 Sheets-Sheet 1

Inventor
Marvin Camras by Hill, Sherman, Meroni, Gross & Simpson
Attys

Sept. 18, 1956 M. CAMRAS 2,763,729

CORE STRUCTURE FOR MAGNETIC TRANSDUCER HEAD

Filed Nov. 3, 1950 3 Sheets-Sheet 2

Inventor
Marvin Camras by Hill, Sherman, Meroni, Gross & Simpson Attys

Sept. 18, 1956 M. CAMRAS 2,763,729

CORE STRUCTURE FOR MAGNETIC TRANSDUCER HEAD

Filed Nov. 3, 1950 3 Sheets-Sheet 3

Inventor
Marvin Camras by Hill, Sherman, Meroni, Gross & Simpson
Attys

United States Patent Office 2,763,729

Patented Sept. 18, 1956

2,763,729

CORE STRUCTURE FOR MAGNETIC TRANSDUCER HEAD

Marvin Camras, Chicago, Ill., assignor to Armour Research Foundation of Illinois Institute of Technology, Chicago, Ill., a corporation of Illinois Application November 3, 1950, Serial No. 193,899

29 Claims. (Cl. 179—100.2)

This invention relates to a core structure for magnetic transducer heads, and more particularly, to a novel core structure having a plurality of nested component parts, with preformed non-magnetic gaps.

One common form of electromagnetic transducer head for magnetic recording and reproducing devices is a head having a core structure with confronting poles with a narrow non-magnetic gap therebetween and over which poles the magnetic record member successively passes. Such a head structure is thus of the type which employs what is commonly known as longitudinal magnetization. I have heretofore found that longitudinal magnetization is greatly improved, as is playback from a record having longitudinal magnetization thereon, if the record member passes over a relatively long iron, or other high permeability, path before it reaches the non-magnetic gap, and then again passes over a long iron, or other high permeability, magnetic path before it leaves the head assembly. It has further been found that core structures are much more efficient when they provide a substantially closed path for the flux in the head.

Head constructions of the general character above referred to, while efficient, have been in the past awkward or expensive to manufacture. One of the principal features and objects of the present invention is to provide novel core constructions for magnetic transducer heads which are economical to manufacture, which are rugged and reliable in use, and which are highly efficient in performance.

It is a further object of the present invention to provide a novel core structure for magnetic transducer heads.

It is a still further object of the present invention to provide a novel nested pole arrangement for electromagnetic transducer heads.

Another and further object of the present invention is to provide a novel method and means for assembling the component parts of an electromagnetic transducer head.

Another and still further object of the present invention is to provide a novel core structure for electromagnetic transducer heads having a plurality of nested component parts and having at least one preformed non-magnetic gap in one of such component parts.

The novel features which I believe to be characteristic of my invention are set forth with particularity in the appended claims. My invention itself, however, both as to its organization, manner of construction, and method of assembly, together with further objects and advantages thereof, may best be understood by reference to the following description taken in connection with the accompanying drawings, in which:

This application is a continuation-in-part of my copending application entitled "Magnetic Transducer Head", U. S. Serial No. 690,877, filed August 16, 1946, now U. S. Patent No. 2,549,771 issued April 24, 1951, which in turn is a continuation-in-part of a copending application Serial No. 596,781, filed May 30, 1945, now U. S. Patent No. 2,481,393 issued September 6, 1949. The claims of my parent case Serial No. 690,877 relate generally to the use of a magnetic keeper in conjunction with an electromagnetic transducer head. In my copending application entitled "Magnetic Transducer Head Assembly," filed October 3, 1950, U. S. Serial No. 188,208, now Patent No. 2,736,775, issued February 28, 1956, which is also a continuation-in-part of U. S. Serial No. 690,877, I have claimed a novel relationship between the width of the pole pieces of a magnetic transducer head assembly with respect to the width of the record member and with respect to each other. The present application is directed to the novel construction of the core itself and to the method of assembling the core structure and its associated coils into a head assembly, as well as to the physical construction of the head assembly.

Figures 1, 3:
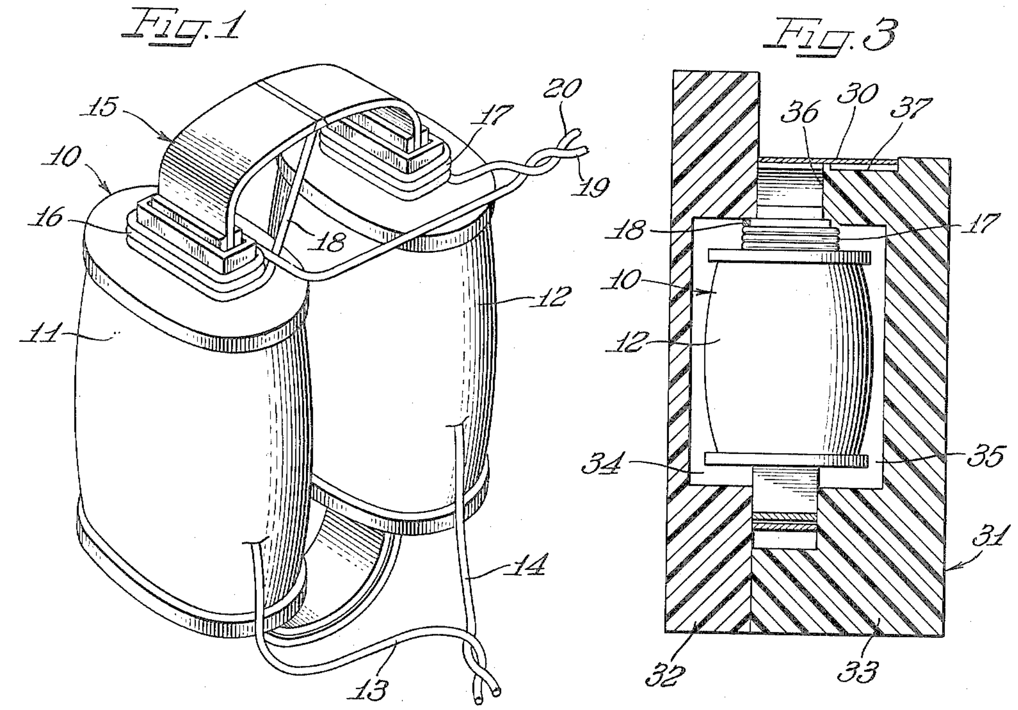
Figure 1 is an isometric view of the core, pole and coil structure of a magnetic transducer erase head.
Figure 3 is a vertical sectional view taken along the line III—III of Figure 2.

In Figure 1 of the drawings, the transducer or magnetic recording and reproducing head 10 includes a pair of signal coils 11 and 12 which are preferably series connected. The leads from these two coils 11 and 12 are indicated at 13 and 14.

In addition to the coils 11 and 12, a few turns of wire are taken around the core structure generally indicated at 15 above each coil 11 and 12 as at 16 and 17. These high frequency windings 16 and 17 are wound in a reverse sense with respect to each other and series connected by the cross lead 18. The input leads of the coils 16 and 17 are indicated at 19 and 20.

Figure 4:
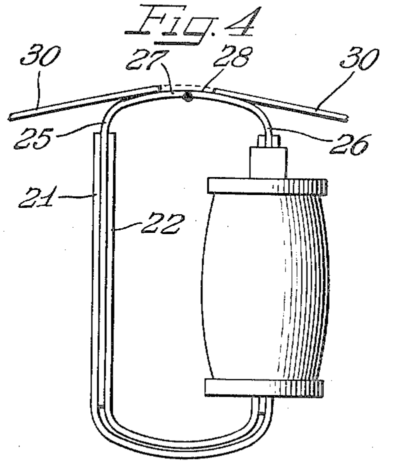
Figure 4 is a front elevational view of the structure shown in Figure 1 with one coil removed in order to show the details of the core structure.

The core and pole structures of the head 10 may be seen best from an inspection of Figure 4 of the drawings. As shown, it is made up of two U-shaped members 21 and 22 and two inverted L-shaped members 23 and 24. The vertical leg 25 on the L-shaped piece 23 and the vertical leg 26 on the L-shaped piece 24 extend down between the upstanding legs of the two U-shaped pieces 21 and 22 in snug nested engagement therewith. Thus, it is apparent that the inner surface portion of the legs of the U-shaped piece 21 and the outer surface portions of the legs of the U-shaped piece 22 defines snug support grooves for the vertical legs of the L-shaped pieces. The L-shaped pole pieces 23 and 24 also have their short legs 27 and 28 projecting toward each other to form polar portions. A short non-metallic gap lies between the two confronting ends of the pole portions 27 and 28. It is filled with solder, or other suitable non-magnetic material 29 which acts as a binder to secure the two L-shaped pole pieces 23 and 24 together as a unit. It is preferable that the legs 27 and 28 be slightly curved as shown, and that their upper surface be smooth so that an elongated magnetizable tape such as the tape 30 may ride thereover.

It will be apparent that the two nested U-shaped pole pieces 21 and 22 define recesses to receive the legs of the L-shaped pieces 25 and 26. Moreover, the depth of these recesses is approximately the length of the leg portions of the pole pieces 25 and 26 inserted therein, thereby providing a maximum degree of efficiency and most effective utilization of material.

As shown in Figure 4, the tape 30 is broken away over the center portion to more clearly show the pole structure, and as shown in Figure 3, the tape 30 is of the dual-channel type. That is to say, the tape 30 is slightly more than twice the width of the pole pieces 27 and 28.

Figure 2:
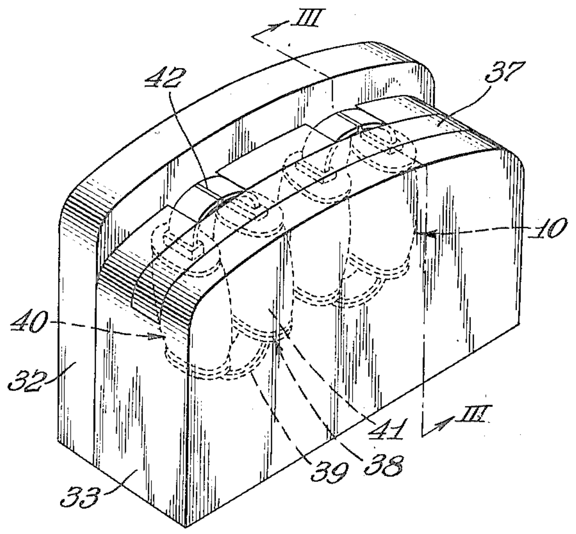
Figure 2 is an isometric view showing a pair of structures similar to the one illustrated in Figure 1 mounted in a complete magnetic transducer head for a magnetic recording and reproducing device.

As may be seen best in Figures 2 and 3 of the drawings, the magnetic transducer head 10 is assembled in a two-piece housing of non-magnetic, non-conducting material indicated generally at 31. This housing 31 includes a rear housing member 32 and a front housing member 33 which are provided with confronting recessed portions 34 and 35, respectively, into which the head 10 is assembled as indicated in Figure 3. The upper wall of the plate 33 is provided with an opening 36 through which the upper surface of the polar portions 27 and 28 slightly project. Also mounted in the upper surface of the plate member 33 is a keeper 37 which is formed of soft iron or other suitable magnetic material having relatively high permeability and low magnetic retentivity.

This keeper 37 is in the form of a strap embedded in the upper surface of the plate member 33 and extends over the entire upper surface, so that approximately half of the width of the tape 30, as it rides over the housing 31, is in contact with this keeper 37. This keeper thus prevents the magnetic field set up by the head 10 during the recording process from influencing the adjacent channel on the tape 30, and also on playback prevents stray pick-up from the adjacent channel.

As shown in Figure 2, the housing 31 is also arranged to have mounted therein an erase coil unit 38 which includes a core 39 similar to the core of the magnetic recording and reproducing head 10 and having a pair of coils 40 and 41 thereon. The erase coil will not, however, have any auxiliary high frequency windings such as the high frequency windings 16 and 17 on the recording and reproducing head 10, and the non-magnetic gap between the confronting polar portions of the core 39 will be slightly wider than the gap in the recording head 10. This is to enable complete demagnetization of the channel on the record member 30 when it passes over the gap 42 in the erase head.

The coils 40 and 41 are, of course, supplied with high frequency electric energy during the recording process in accordance with a technique which is well known to those skilled in the art. It will furthermore be understood that the record member 30 passes over first the erase head 38 and then over the recording and reproducing head 10 during the recording operation.

It will be observed that the keeper 37 also lies adjacent the erase head 38 so as to prevent interference with the adjacent channel.

Figure 5:
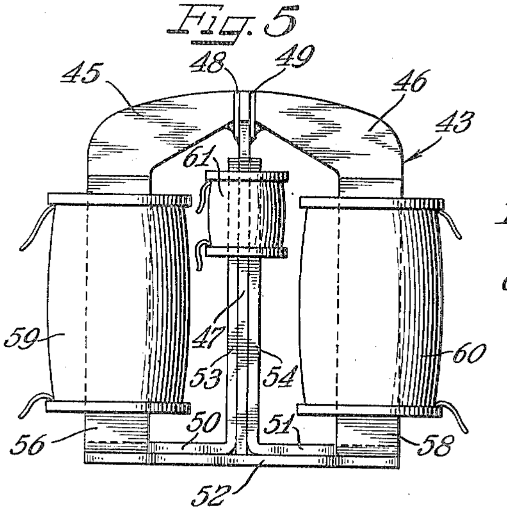
Figure 5 is a front elevational view of a core and coil assembly of a magnetic transducer head illustrating a modified form of the present invention.
Figures 6, 8, 9:
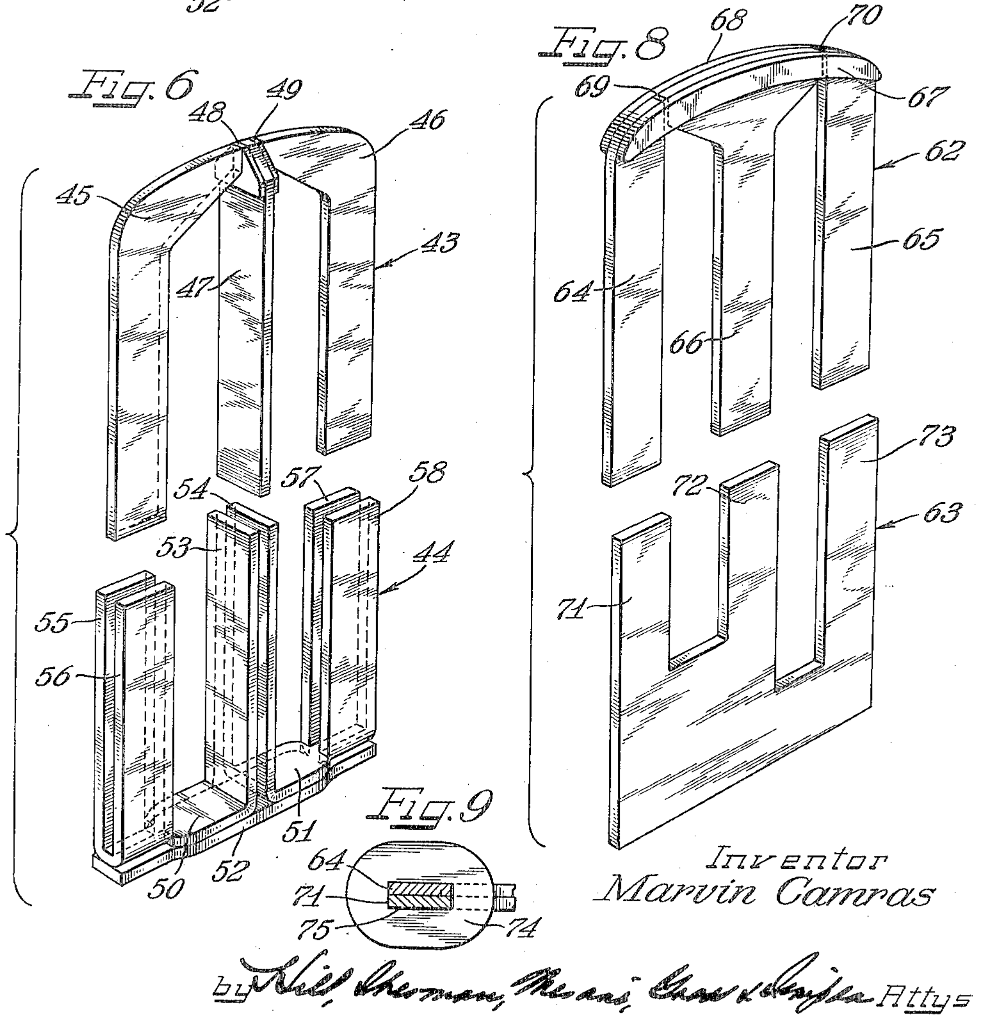
Figure 6 is an exploded, isometric view of the core structure of the head shown in Figure 5.
Figure 8 is an exploded, isometric view of the core structure of the head shown in Figure 7.
Figure 9 is a fragmentary, sectional view taken along the line IX—IX of Figure 7.

A second embodiment of the present invention is illustrated in Figures 5 and 6 of the drawings. Here, the erase head is combined with the record-playback head, and a unitary magnetic core structure is, therefore, provided. As may be seen best in Figure 6, the core structure is made up essentially of two main parts 43 and 44. The upper core part 43 is composed of two inverted L-shaped pieces 45 and 46, a center leg piece 47, and two spacers of non-magnetic material such as copper 48 and 49. The spacers 48 and 49 are in the form of shims and are of a thickness corresponding to the desired gap width for the erasing operation and for the record-playback operation. While these shims, which define the non-magnetic gaps in the head, may be substantially the same, it has been found in practice that the erase gap should preferably be around .010 inch and the record-playback gap should be approximately .002 inch.

The pieces 45, 46, 47, 48 and 49 are physically secured together as shown in the upper half of Figure 6 in any suitable manner, such, for example, as by soldering.

The lower part of the core structure is made up of three pieces 50, 51 and 52. The pieces 50 and 51 are preferably made from stampings and are bent up to provide a center leg 53 and 54, respectively, and respective pairs of side legs 55 and 56 for the piece 50 and 57 and 58 for the piece 51. The upstanding leg portions 55 and 56 are spaced sufficiently far apart to receive the downwardly extending leg of the L-shaped piece 45 while the upstanding legs 57 and 58 are spaced apart far enough to just receive the downwardly extending leg of the L-shaped piece 46. The pieces 50 and 51 are secured to the base piece 52 in any suitable manner such, for example, as by soldering, gluing or the like, and the upstanding legs 53 and 54 are so positioned with respect to each other as to just receive the downwardly extending leg 47 of the upper core part 43. While the pieces 50 and 51 must be of magnetic material, the base piece may be of any suitable material having sufficient structural strength for the purpose.

From the above description, it will be apparent that after the preliminary forming and assembling operation, the core is composed of a single unitary upper part having a pair of preformed gaps therein and a single unitary lower part adapted to receive the upper part in nested relation after the coils have been assembled thereon. It will thus be immediately apparent that an erase coil 59, a record-playback coil 60, and a bias coil 61 may be dropped into position on the three pairs of upstanding legs 55—56, 57—58 and 53—54, respectively. The upper core part 43 is then moved down into nested relationship with the lower part (without, of course, interfering in any way with the coils 59, 60 and 61), thus providing a unitary head assembly as shown in Figure 5 of the drawings.

It is to be noted that due to the fact that the plane of the overlap of the center legs is at right angles to the plane of the overlap of the outer legs, the whole structure is aligned and confined both laterally and longitudinally of the direction of motion of the record member.

The bias coil 61 is, of course, arranged to be connected to a suitable source of high frequency current to provide the desired high frequency bias during the recording operation, and when a signal to be recorded is being supplied to the coil 60. The erase coil 59 is, of course, arranged to be connected to a suitable source of alternating current, preferably high frequency alternating current, to demagnetize the wire in advance of the recording during the recording operation. If desired, the bias coil 61 may be connected in series with the erase coil 59 in such a direction as to aid the field at the erase gap. It will, of course, be understood that the erase coil 59 and the high frequency bias coil 61 are both deenergized during the playback operation when flux set up in the core structure by the magnetized record threads the coil 60.

Figure 7:
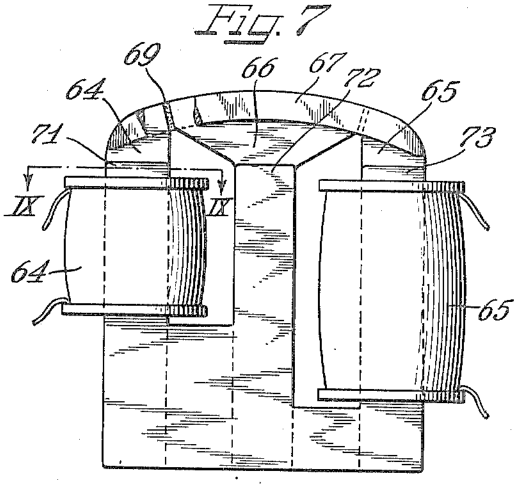
Figure 7 is a front elevational view of a core and coil assembly illustrating a third embodiment of the present invention.

A third embodiment of the present invention is illustrated in Figures 7, 8 and 9 of the drawings. In this particular form of the invention, the upper core part 62 has a nested relation with the lower core part 63 in an overlapping sense only, the erase coil 64 and the record-playback coil 65 being so shaped as to hold the upper and lower core parts in close, overlapping contact with each other.

As shown particularly in Figure 8, the upper core part 62 is provided with a pair of downwardly extending legs 64 and 65 and a T-shaped center leg 66. These three legs 64, 65 and 66 are held together by a pair of side members 67 and 68 which are soldered or otherwise suitably secured to the leg members 64, 65 and 66 to maintain them in a unitary assembly. In securing the side members 67 and 68 to the legs, the legs are so positioned as to provide a pair of non-magnetic gaps 69 and 70 in the assembly. While these gaps are preferably filled with a non-magnetic material such as solder or the like, they may remain opened and, therefore, provide air gaps if desired, since the side members 67 and 68 hold the three leg members in desired position with respect to each other. The lower core part 63 is a single piece of high permeability material having three upstanding legs 71, 72 and 73 which are arranged to overlap and lie in intimate contact with the legs 64, 66 and 65, respectively, of the upper core part 62.

When the head is assembled, whatever coils are to be mounted on the structure are locked over either the legs of the lower part or the legs of the upper part. By way of example, an erase coil 64 is dropped over the leg 61 and a record-playback coil is dropped over the leg 63. The erase coil 64 is preferably provided with a spool or core structure 74 having a rectangular opening 75 therein which is just of sufficient size to receive the overlapped, nested legs 64 and 71 therein. The coil 65 is similarly provided with a suitable spool or core structure having an opening similar to that shown in Figure 9 for the erase coil 64 so as to receive the overlapped, nested legs 65 and 73.

Figure 10:
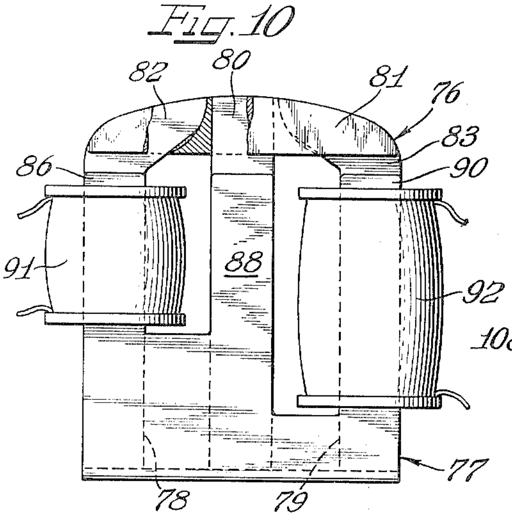
Figure 10 is a front elevational view of the core and coil assembly of a magnetic transducer head illustrating a fourth embodiment of the present invention.
Figure 11:
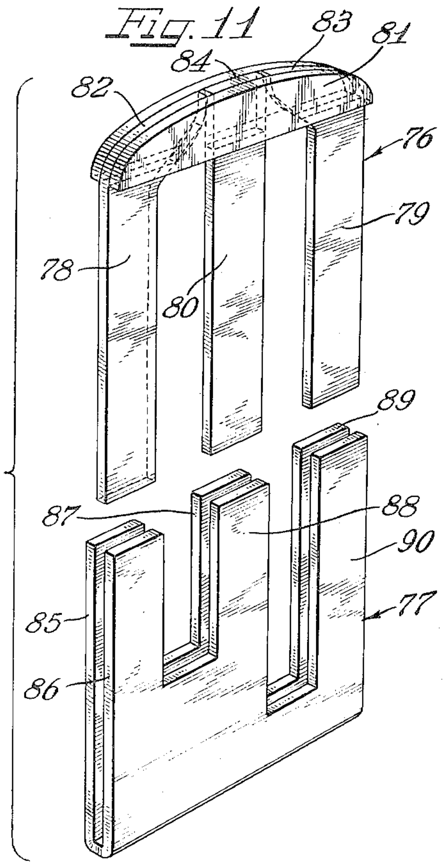
Figure 11 is an exploded, isometric view of the core of the head shown in Figure 10.

A fourth embodiment of the present invention is illustrated in Figures 10 and 11 of the drawings, where again, a unitary upper core part 76 and a unitary lower core part 77 are provided. In this form of the invention, the upper core part 76 is composed of a pair of inverted L-shaped legs 78 and 79 and a center leg 80. These three pieces are held together by a single non-magnetic member 81 which is machined or die cast at its two ends as at 82 and 83 so as to just receive the short legs of the inverted, L-shaped members 78 and 79. It is also machined out in its center to provide an opening 84 therethrough, through which the center leg 80 extends. This upper member 81 is thus a single solid block of non-magnetic material, such, for example, as brass, or other wear-resisting material, and which block has been milled out or otherwise cut so as to receive the three leg members 78, 79 and 80 which are formed of material having high permeability and low magnetic retentivity. The pieces 78, 79 and 80 are suitably secured to the block 81, such, for example, as by soldering or by gluing. It has been found in a structure of this type that the block which provides side pieces as well as a means for securing the component parts of the upper core part together, tends to prevent accumulation of magnetic particles at the side edges of the gap, and also tends to reduce wear on the core parts.

The lower part 77 is made from a single stamping which is folded up to provide a pair of legs 85 and 86 which receive the upper leg 78 therebetween; a pair of legs 87 and 88 which receive the upper leg 80 therebetween; and a pair of legs 89 and 90 which receive the upper leg 79 therebetween, all in close nested relationship. An erase coil 91 and a record-playback coil 92 are dropped over the legs 85—86 and 89—90, respectively, of the lower core part 77 before the upper core part 76 is lowered into place.

Figure 12:
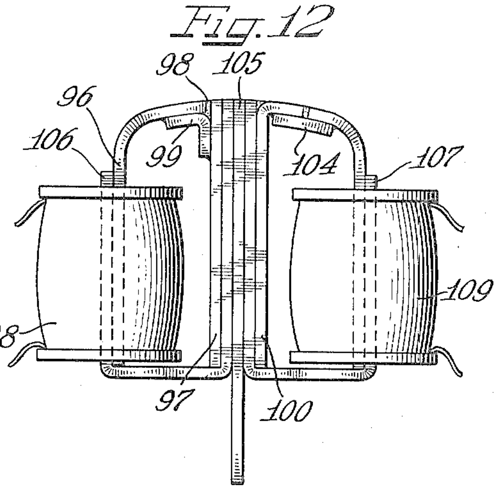
Figure 12 is a front elevational view of a core and coil assembly of a magnetic transducer head illustrating a fifth embodiment of the present invention.
Figure 13:
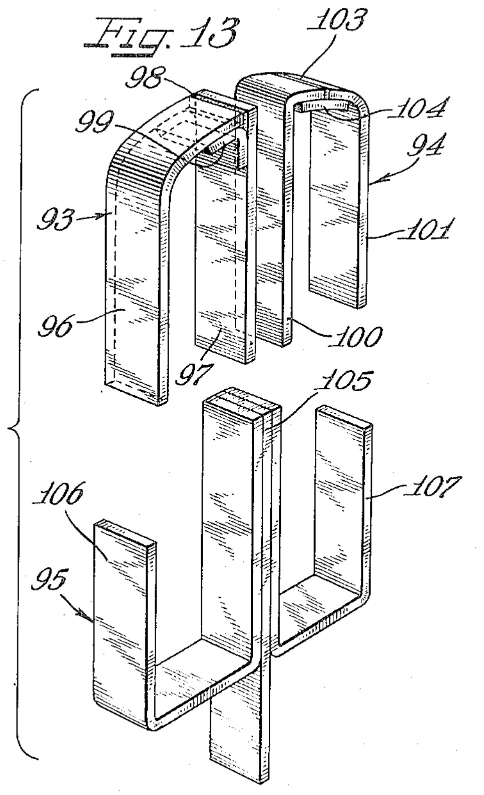
Figure 13 is an exploded, isometric view of the core construction of the head shown in Figure 12.

A fifth embodiment of the present invention is illustrated in Figures 12 and 13 of the drawings. Here, two upper core parts 93 and 94 are provided and a lower core part 95. The upper core part 93 is made of an inverted, L-shaped piece of magnetic material 96 and a straight piece of strip stock 97. These two legs 96 and 97 are secured together with a non-magnetic gap 98 therebetween in any suitable manner such as by soldering or the like. To reinforce this assembly, an angle piece 99 is preferably employed just below the junction of the legs 96 and 97. This angle piece 99 may be secured in any suitable manner to the legs 96 and 97 such, for example, as by soldering.

The core part 94 is made up of two inverted, L-shaped pieces of magnetic material 100 and 101 which are secured together in such a manner as to provide a non-magnetic gap 103 therebetween. This gap may be filled with solder or other suitable non-magnetic material as at 103. A reinforcing strip 104 is preferably provided immediately below the non-magnetic gap 103 to reinforce the structure. This piece 104 may be secured to the legs 100 and 101 in any suitable manner such, for example, as by soldering.

The lower core part 95 is made up of an upstanding center leg 105 and two U-shaped pieces 106 and 107. The U-shaped pieces 106 and 107 are secured to the upstanding leg 105 in any suitable manner such as by soldering or the like. The relative dimensioning of the parts is such that the legs 96 and 97 of the upper core part 93 will just nest within the lower U-shaped piece 106 of the lower core part 95. Similarly, the legs 100 and 101 of the upper core part 94 are arranged to just nest within the lower U-shaped piece 107 of the lower core part 95. Here again, an erase coil 108 and a record-playback coil 109 are provided which may be conveniently dropped over the outer legs of the U-shaped members 106 and 107, respectively, before the upper core parts 93 and 94 are lowered into place.

It will be observed that the center leg 105 of the lower core part 95 extends down below the bottom of the two U-shaped pieces 106 and 107. It has been found that this conveniently provides a simple mounting member for the entire head assembly.

It will be apparent from the foregoing description that all structures embodying the present invention possess the highly desirable feature of an easily replaceable core part which is subjected to the maximum wear. In other words, it is not necessary to replace an entire head assembly when a core structure wears in the region of the gap, but it is only necessary to replace this upper portion of the core itself, and this may be done without in any way disturbing the lower core part or the cores themselves.

This invention also enables economical and convenient manufacture of electromagnetic transducer heads, since the base part need not be manufactured to close tolerances, and since the manufacture of a core part outside of the acceptable tolerances does not require an entire head assembly to be thrown away, but merely the upper portion of the core.

It will be observed further that in these various head assemblies, and particularly in head assemblies of the type shown in Figures 1, 7, 10 and 12, the coils themselves play a direct role in maintaining the separable core parts in a firm, aligned relationship.

While I have shown certain particular embodiments of my invention, it will, of course, be understood that I do not wish to be limited thereto since many modifications may be made, and I, therefore, contemplate by the appended claims to cover all such modifications as fall within the true spirit and scope of my invention.

I claim as my invention:

1. A magnetic transducer head assembly including a pair of L-shaped magnetic members, one leg of each member extending toward the corresponding leg of the other to define a non-magnetic gap, and a pair of nested U-shaped magnetic members defining grooves which receive the other leg of each of said L-shaped magnetic members.

2. A magnetic transducer head assembly including a pair of relatively wide strips of magnetic material bent about their smallest dimension to define L-shaped members, one leg of each member extending toward the corresponding leg of the other to define a non-magnetic gap, and a pair of relatively wide strips of magnetic material which are bent about their smallest dimension to form U-shaped members one of which is nestable within the other, said U-shaped members being disposed in such nested relation to define grooves which receive the other leg of each of said first members.

3. A magnetic transducer head assembly including a pair of L-shaped magnetic members, one leg of each member extending toward the corresponding leg of the other to define a non-magnetic gap, and a pair of nested U-shaped members which define grooves to receive the other leg of each of said first members, said grooves being of length substantially equal to the length of said other leg of each of said first members.

4. A magnetic transducer head assembly including a pair of relatively wide strips of magnetic material bent about their smallest dimension to define a pair of L-shaped members, one leg of each member extending toward the corresponding leg of the other to define a non-magnetic gap, a pair of relatively wide magnetic strips which are bent about their smallest dimension to form U-shaped members one of which is nestable within the other, said U-shaped members in such nested relation defining grooves to receive the other leg of each of said L-shaped members, the depth of said grooves being substantially equal to the length of said other leg of each said L-shaped members, and windings surrounding said members in the region of said grooves.

5. An electromagnetic transducer head comprising a plurality of unitary core parts mounted together in overlapping relationship, at least one of said core parts having a non-magnetic gap therein across which a magnetic record member is arranged to pass, and an electric coil mounted over at least a part of the overlapping portions of said core parts.

6. An electromagnetic transducer head comprising a plurality of unitary core parts mounted together in overlapping nested relationship, at least two of said core parts each having a non-magnetic gap therein across which a magnetic record member is arranged to successively pass and there being at least one additional core part having no non-magnetic region therein, and an electric coil mounted over the nested junction of each of said first two core parts with said third core part.

7. An electromagnetic transducer head comprising a plurality of unitary core parts mounted together in overlapping relationship, at least one of said core parts having a non-magnetic gap therein across which a magnetic record member is arranged to pass, and an electric coil mounted over at least a part of the overlapping portions of said core parts, said core part which has said non-magnetic gap being formed of a plurality of core pieces rigidly secured to each other in the region of said gap.

8. An electromagnetic transducer head comprising a pair of unitary core parts mounted together in overlapped relationship, one of said core parts having at least one non-magnetic gap along an edge thereof spaced from said overlapping portions, said edge being arranged to have a magnetic record member pass thereover, and a coil mounted on said core parts over at least a part of the overlapping portions thereof.

9. An eletcromagnetic transducer head comprising a pair of unitary core parts mounted together in overlapped relationship, one of said core parts having a pair of non-magnetic gaps along an edge thereof spaced from said overlapping portions, said edge being arranged to have a magnetic record member pass thereover, and a coil mounted on said core parts over at least a part of the overlapping portions thereof.

10. An electromagnetic transducer head comprising a pair of unitary core parts mounted together in overlapped relationship, one of said core parts having at least one non-magnetic gap along an edge thereof spaced from said overlapping portions, said edge being arranged to have a magnetic record member pass thereover, a coil mounted on said core parts over at least a part of the overlapping portions thereof, and a reinforcing member overlying a portion of said part having the non-magnetic gap therein in the region of said non-magnetic gap.

11. An electromagnetic transducer head comprising a pair of core parts arranged to be mounted together in partial overlapping relationship, one of said core parts having three legs extending in the same general direction and the other core part being formed of three separate pieces rigidly secured together, said three pieces providing legs extending toward said legs of said first core part, said second core part having a pair of non-magnetic gaps at their junction with each other, means rigidly securing said three separate pieces together in the region of said non-magnetic gaps, and a pair of coils mounted respectively around two sets of overlapping legs.

12. An electromagnetic transducer head comprising a core base part having three integral upstanding legs, a three-element upper core part having three downwardly extending legs overlapping said legs, respectively, of said base part, said three elements having their upper ends slightly spaced to define a pair of non-magnetic gaps and being rigidly secured together to form a unitary upper core part which may be separated as a unit from said lower part, a coil around one pair of overlapped legs, and a second coil around a second pair of overlapped legs.

13. An electromagnetic transducer head comprising a core base part including a pair of spaced upstanding U-shaped members lying substantially in a single plane and a base member to which both of said U-shaped members are secured, a three-element upper core part having three downwardly extending legs overlapping the legs of said base part, said three elements being rigidly secured together to form a unitary upper core part which may be separated as a unit from said lower core part, there being non-magnetic gaps formed at the junctions of said three elements of said upper core part, a coil around one pair of overlapped legs, and a second coil around a second pair of overlapped legs.

14. An electromagnetic transducer head comprising a core base part having two generally U-shaped members and a base piece securing said U-shaped members in spaced relationship and lying generally in a single plane, the outer legs respectively of said U-shaped members each consisting of a pair of spaced upstanding strips lying in spaced parallel planes and the inner leg of each of said U-shaped members being in the form of a single upstanding strip lying in spaced parallel planes with respect to each other and which planes are at right angles to the planes of said outer legs, a three-element upper core part having three downwardly extending legs disposed in nested engagement with the legs of said core base part, said three elements being rigidly secured together to form a unitary upper core part which may be separated as a unit from said lower core part, there being a non-magnetic gap at the junction between each of the outer elements and the central element of said upper core part, and a pair of coils disposed around the outer nested legs respectively of said upper and lower core parts.

15. An electromagnetic transducer head comprising a core base part having a central upstanding post and a pair of upstanding U-shaped members mounted on said post on opposite sides thereof and lying substantially in a single plane, and a pair of upper core parts each including a pair of downwardly extending legs disposed in nested overlying relationship with the upstanding U-shaped members of said base part, said downwardly extending legs of each of said upper parts being rigidly secured together to form separate unitary upper core parts each of which may be separated as a unit from said lower core part, each of said upper core parts having a non-magnetic gap therein spaced from the portions thereof which lie in nested engagement with the base part, and a pair of coils around the nested outer legs respectively of said upper and lower core parts.

16. An electromagnetic transducer head comprising a core base part having three integral upstanding legs, an upper core part including three members having downwardly extending leg portions overlapping said legs respectively of said base part, said three members lying in a single plane and also including pole portions so shaped and spaced as to provide non-magnetic gaps therebetween, and a pair of non-magnetic side pieces extending across the upper part of each of said members and on opposite sides thereof and secured thereto to bind said members together in a unitary upper core part which may be separated as a unit from said lower core part, and a pair of coils around the overlapped outer legs respectively of the upper and lower core parts.

17. An electromagnetic transducer head comprising a core base part having three pairs of integral upstanding legs, an upper core part having two inverted L-shaped outer legs and a central leg extending downwardly in nested engagement with said three pairs of upstanding legs respectively, a single integral top member having a pair of side slots and a central slot therein for receiving the upper ends of said legs of said upper core part respectively, said legs of said upper core part being secured to said top member, whereby said top member and said upper legs form a single unitary upper core part which may be separated as a unit from said lower core part, the upper ends of said upper legs being positioned with respect to said central leg to form a pair of non-magnetic gaps in the top surface of said upper core part, and a pair of coils around the nested outer legs of said upper and lower core parts, respectively.

18. In a magnetic head construction, a pair of pole members of elongated flat strip construction each terminating in opposite free ends, one end of one pole member terminating in closely spaced relation to one end of the other pole member to define a non-magnetic gap, non-magnetic means rigidly secured to said one free ends of said pole members and spanning therebetween to rigidly secure said one free ends in fixedly spaced relation, the opposite free ends of said pole members being straight and extending in spaced generally parallel relation and in the same general direction from said one free ends, separate magnetic core means of flat strip construction including straight elongated flat strip free end portions extending in spaced parallel relation and extending in the opposite direction from said pole member free ends and having broad surfaces in face-to-face sliding contacting relation with broad surfaces of the respective pole member free ends, said core means including said flat strip free end portions defining a closed magnetic circuit with said pole members and said non-magnetic gap, and an electric coil mounted over one of said pole member free ends and the flat strip free end portion in contact therewith, said pole members being separable as a unit from said core means by means of the sliding contacting relation between the pole member free ends and the flat strip free end portions without disturbing the rigidly fixed spacing between said one free ends thereof, and said electric coil being freely removable from the flat strip free end portion with which associated after separation of said pole members from said core means.

19. In a magnetic head construction, a pair of pole members of elongated flat strip construction, each terminating in opposite free ends, one end of one pole member terminating in closely spaced relation to one end of the other pole member to define a non-magnetic gap, non-magnetic means rigidly secured to said one free ends of said pole members and spanning therebetween to rigidly secure said one free ends in fixedly spaced relation, the opposite free ends of said pole members being straight and extending in the same general direction from said one free ends, separate magnetic core means of flat strip construction including flat strip portions having broad surfaces in face-to-face sliding contacting relation with broad surfaces of the respective pole member free ends, said core means including said flat strip portions defining a closed magnetic circuit with said pole members and said non-magnetic gap, and an electric coil mounted over one of the straight pole member free ends and linking said magnetic circuit, said pole members being separable as a unit from said core means by means of the sliding contacting relation between the pole member free ends and the flat strip portions of said core means without disturbing the rigidly fixed spacing between said one free ends of said pole members, and said electric coil being freely removable from said pole member straight free end with which associated after separation of said pole members from said core means.

20. In a magnetic head construction, a pair of pole members of elongated flat strip construction each terminating in opposite free ends, one end of one pole member having its end edge in closely spaced confronting aligned relation to the end edge of one end of the other pole member to define a non-magnetic gap with the relatively broad surfaces of said one free ends of said pole members adjacent said gap being shaped to engage a traveling magnetic record member passed thereover, non-magnetic means rigidly secured to said one free ends of said pole member and spanning therebetween to rigidly secure said end edges of said one free ends in fixedly spaced relation, the opposite free ends of said pole members being straight and extending in spaced generally parallel relation and in the same general direction from said one free ends, a separate U-shaped yoke of flat strip magnetic material having leg members extending in sliding broad surface contact with the respective other free ends of said pole members to complete a closed magnetic circuit with said pole members and said non-magnetic gap, and an electric coil mounted over one of said pole member free ends and the leg member in contact therewith, said pole members being separable as a unit from said U-shaped yoke by means of the sliding contacting relation between the pole member free ends and the legs of the yoke without disturbing the rigidly fixed spacing between said end edges of said one free ends of said pole members, and said electric coil being freely removable from the leg of said U-shaped yoke with which associated after separation of pole members from said yoke.

21. In a magnetic head construction, a pair of pole members of elongated flat strip construction each terminating in opposite free ends, one end of one pole member being in closely spaced relation to one end of the other pole member to define a non-magnetic gap, non-magnetic means interposed between said one ends of said pole members to fixedly space the same, the opposite free ends of said pole members being straight and extending in the same general direction from said one free ends, separate magnetic core means of flat strip construction including straight elongated flat strip free end portions extending in the opposite direction from said pole member free ends, and having broad surfaces in face-to-face contacting relation with broad surfaces of the respective pole member free ends, said core means including said flat strip free end portions defining a closed magnetic circuit with said pole members and said non-magnetic gap, and an electric coil linking said magnetic circuit, said pole members being separable as a unit from said core means by means of the sliding contacting relation between the pole member free ends and the flat strip free end portions without removing said electric coil.

22. In a magnetic head construction, a pair of pole members of elongated flat strip construction each terminating in opposite free ends, one end of one pole member being in closely spaced relation to one end of the other pole member to define a non-magnetic gap, non-magnetic means rigidly secured to said one free ends of said pole members and spanning therebetween to rigidly secure said one free ends in fixedly spaced relation, at least one of the opposite free ends of said pole members being straight, separate magnetic core means of flat strip construction including at least one straight elongated flat strip free end portion extending in the opposite direction from said one straight free end of said pole members and being in broad surface sliding contacting relation with said one straight free end, said core means including said straight flat strip free end portion defining a closed magnetic circuit with said pole members and said non-magnetic gap, and an electric coil mounted over said one straight free end and said straight flat strip free end portion, said pole members being separable as a unit from said core means by means of the sliding contacting relation between the pole member straight free end and the flat strip straight free end portion without disturbing the rigidly fixed spacing between said one free ends of said pole members, and said electric coil being freely removable from the straight flat strip free end portion after separation of said pole members from said core means.

23. In a magnetic head construction, a pair of pole members of elongated flat strip construction each terminating in opposite free ends, one end of one pole member being in closely spaced relation to one end of the other pole member to define a non-magnetic gap, non-magnetic means interposed between said one free ends of said pole members to fixedly space the same, separate magnetic core means of flat strip construction including flat strip portions having broad surface sliding contact with the respective pole member free ends to complete a closed magnetic circuit with said pole members and said non-magnetic gap, and an electric coil linking said magnetic circuit, said pole members being separable as a unit from said core means by means of the sliding contacting relation between the pole member free ends and the flat strip portions of the core means without disturbing the rigidly fixed spacing between said one free ends of said pole members.

24. In a magnetic head construction, a pair of pole members of magnetic material having adjacent closely spaced portions defining a non-magnetic gap, non-magnetic means engaging said pole members and rigidly fixing the spacing between said closely spaced portions thereof, separate magnetic core means having portions extending in contacting overlapping relation to the respective pole members to define a closed magnetic circuit including said pole members and said non-magnetic gap, and an electric coil linking said magnetic circuit, said pole members being separable as a unit from said core means without disturbing the rigidly fixed spacing between the closely spaced portions thereof by means of overlapping engagement between the pole members and the core means, said pole members at said gap being shaped to cooperate with a traveling magnetic impulse record member passed thereover.

25. A magnetic transducer head assembly including a pair of relatively wide strips of magnetic material bent about their smallest dimension to define a pair of L-shaped members, one leg of each member extending toward the corresponding leg of the other to define a non-magnetic gap, a pair of relatively wide magnetic strips which are bent about their smallest dimension to form U-shaped members one of which is nestable within the other, said U-shaped members in such nested relation defining grooves to receive the other leg of each of said L-shaped members, the depth of said grooves being substantially equal to the length of said other leg of each said L-shaped members, and windings surrounding said members in the region of said grooves, the U-shaped members having substantially straight legs of length at least substantially equal to the length of said windings, and said other legs of said L-shaped members being substantially straight over a distance from the free ends thereof at least substantially equal to the length of said windings to be freely removable from said windings while the windings remain in surrounding relation to said U-shaped members.

26. In a magnetic head construction, a pair of pole members of elongated flat strip construction each terminating in opposite free ends, one end of one pole member being in closely spaced relation to one end of the other pole member to define a non-magnetic gap, non-magnetic means rigidly secured to said one free ends of said pole members and spanning therebetween to rigidly secure said one free ends in fixedly spaced relation, at least one of the opposite free ends of said pole members being straight, separate magnetic core means of flat strip construction including at least one straight elongated flat strip free end portion extending in the opposite direction from said one straight free end of said pole members and being in broad surface sliding contacting relation with said one straight free end, said core means including said straight flat strip free end portion defining a closed magnetic circuit with said pole members and said non-magnetic gap, and an electric coil mounted over said one straight free end and said straight flat strip free end portion, said pole members being separable as a unit from said core means by means of the sliding contacting relation between the pole member straight free end and the flat strip straight free end portion without disturbing the rigidly fixed spacing between said one free ends of said pole members, and said electric coil being freely removable from the straight flat strip free end portion after separation of said pole members from said core means, said straight flat strip free end portion and said one straight free end being in contacting relation over a distance at least substantially equal to the length of said electric coil.

27. A magnetic transducer head assembly including a pair of relatively wide strips of magnetic material bent about their smallest dimension to define a pair of L-shaped members, one leg of each member extending toward the corresponding leg of the other to define a non-magnetic gap, a pair of relatively wide magnetic strips which are bent about their smallest dimension to form U-shaped members one of which is nestable within the other, said U-shaped members in such nested relation defining grooves to receive the other leg of each of said L-shaped members, the depth of said grooves being substantially equal to the length of said other leg of each said L-shaped members, and windings surrounding said members in the region of said grooves, the U-shaped members having substantially straight legs of length at least substantially equal to the length of said windings, said other legs of said L-shaped members being substantially straight over a distance from the free ends thereof at least substantially equal to the length of said windings to be freely removable from said windings while the windings remain in surrounding relation to said U-shaped members, and the terminal portions of the free ends of the legs of the U-shaped members projecting beyond the windings in assembled relation thereof to afford convenient entrance of said other leg free ends of said L-shaped members.

28. A magnetic transducer head assembly including a pair of relatively wide strips of magnetic material bent about their smallest dimension to define a pair of L-shaped members, one leg of each member extending toward the corresponding leg of the other to define a non-magnetic gap, a pair of relatively wide magnetic strips which are bent about their smallest dimension to form U-shaped members one of which is nestable within the other, said U-shaped members in such nested relation defining grooves to receive the other leg of each of said L-shaped members, the depth of said grooves being substantially equal to the length of said other leg of each said L-shaped members, and windings surrounding said members in the region of said grooves, the U-shaped members having substantially straight legs of length at least substantially equal to the length of said windings, and said other legs of said L-shaped members being substantially straight over a distance from the free ends thereof at least substantially equal to the length of said windings to be freely removable from said windings while the windings remain in surrounding relation to said U-shaped members, and said windings each having means defining a generally rectangular opening extending substantially straight and axially through the length of the winding, and having the straight legs of the U-shaped members and said other legs of said L-shaped members associated therewith extending in close fitting relation through the rectangular openings.

29. In a magnetic head construction, a pair of pole members of elongated flat strip construction each terminating in opposite free ends, one end of one pole member being in closely spaced relation to one end of the other pole member to define a non-magnetic gap, non-magnetic means rigidly secured to said one free ends of said pole members and spanning therebetween to rigidly secure said one free ends in fixedly spaced relation, at least one of the opposite free ends of said pole members being straight, separate magnetic core means of flat strip construction including at least one straight elongated flat strip free end portion extending in the opposite direction from said one straight free end of said pole members and being in broad surface sliding contacting relation with said one straight free end, said core means including said straight flat strip free end portion defining a a closed magnetic circuit with said pole members and said non-magnetic gap, and an electric coil mounted over said one straight free end and said straight flat strip free end portion, said pole members being separable as a unit from said core means by means of the sliding contacting relation between the pole member straight free end and the flat strip straight free end portion without disturbing the pole members, and said electric coil being freely remov- rigidly fixed spacing between said one free ends of said able from the straight flat strip free end portion after separation of said pole members from said core means, said straight flat strip free end portion and said one straight free end being in contacting relation over a distance at least substantially equal to the length of said electric coil, said electric coil having means providing a straight axial opening extending through said coil and receiving said pole member straight free end and said flat strip free end portion in relatively slidable relation therein.

References Cited in the file of this patent

UNITED STATES PATENTS

| | | |
|---|---|---|
| 1,102,513 | Johannesen | July 17, 1914 |
| 2,413,108 | Latchford | Dec. 24, 1946 |
| 2,469,444 | Roys | May 10, 1949 |
| 2,523,576 | Kornei | Sept. 26, 1950 |

FOREIGN PATENTS

| | | |
|---|---|---|
| 262,323 | Switzerland | Sept. 16, 1949 |